United States Patent [19]
Hartung

[11] 4,031,366
[45] June 21, 1977

[54] LOW CYCLE FATIGUE DAMAGE COUNTER

[75] Inventor: Robert L. Hartung, Fort Worth, Tex.

[73] Assignee: Howell Instruments, Inc., Fort Worth, Tex.

[22] Filed: Oct. 30, 1975

[21] Appl. No.: 627,458

[52] U.S. Cl. .............................. 235/151.3; 73/67.3; 235/92 MT

[51] Int. Cl.[2] ...................... G01V 1/28; G01M 7/00

[58] Field of Search .......... 235/151.3, 151, 92 MT, 235/92 PD, 92 MP, 92 EL, 92 AE, 92 DN, 181, 183, 150.2; 73/104, 67.3, 91; 340/267 R

[56] References Cited

UNITED STATES PATENTS

| | | | |
|---|---|---|---|
| 3,711,686 | 1/1973 | Apitz | 235/92 DM |
| 3,744,300 | 7/1973 | Fleury | 73/67.3 |
| 3,777,555 | 12/1973 | Petrisko et al. | 73/91 |
| 3,835,305 | 9/1974 | Kus | 235/92 EL |
| 3,841,149 | 10/1974 | Edwin et al. | 235/151.3 |
| 3,878,384 | 4/1975 | Bowker | 235/151.3 |
| 3,914,996 | 10/1975 | Davis et al. | 235/151.3 |
| 3,979,579 | 9/1976 | Kleinpeter | 235/150.2 |

FOREIGN PATENTS OR APPLICATIONS

| | | | |
|---|---|---|---|
| 39,427 | 10/1972 | Japan | 73/91 |

*Primary Examiner*—Malcolm A. Morrison
*Assistant Examiner*—Errol A. Krass
*Attorney, Agent, or Firm*—Cushman, Darby & Cushman

[57] ABSTRACT

An electrical input signal representative of the existing operating state of a rotating bladed disk or other rotating member is classified into one of a plurality of predetermined operating states and a sequence detector is employed for detecting the occurrence of one of a plurality of possible predetermined sequences of such operating states. Predetermined fixed damage coefficients are then correlated with respectively corresponding detected predetermined sequences of operating states and accumulated with other similarly selected damage coefficients so as to provide a cumulative indication of low cycle fatigue damage done to the rotating member over its past history of experienced operating state sequences.

16 Claims, 4 Drawing Figures

| REGION | $\downarrow\bar{A}$ | $\downarrow\bar{B}$ | $\downarrow\bar{C}$ | $\downarrow\bar{D}$ | $\uparrow A$ | $\downarrow B$ | $\downarrow C$ | $\downarrow D$ |
|---|---|---|---|---|---|---|---|---|
| 1 | − | + | + | + | + | − | − | − |
| 2 | + | + | + | + | − | − | − | − |
| 3 | + | − | + | + | − | + | − | − |
| 4 | + | − | − | + | − | + | + | − |
| 5 | + | − | − | − | − | + | + | + |

Fig. 4

LOW CYCLE FATIGUE DAMAGE COUNTER

This invention relates to apparatus for detecting and indicating cumulative low cycle fatigue damage done to a rotating bladed disk or other rotating member due to its sequential passage through different operating states. Such a rotating bladed disk may, for example, be found in the compressor or turbine portion of a conventional turbine engine such as are commonly used to power aircraft. Such a bladed disk may also, for example, be found in a driven compressor utilized in transmitting gaseous material through pipeline conduits, etc.

It is generally recognized that the life expectancy of such a rotating bladed disk is a function of its past operating history. For example, the portion of overall life expectancy consumed during one hour of clock time for a blade established at a constant operating state is less than the portion consumed during the same time period by another disk which is experiencing significant changes in its operating status over that time period.

The general problem of calculating the effective operating time of an apparatus such as a turbine engine as a function of some operating parameter has been approached heretofore. For instance, there is an equivalent operating time apparatus described in U.S. Pat. No. 3,237,448 issued to J. F. Howell et al. on Mar. 1, 1966, which controls the rate at which counts are accumulated in a counter as a function of the engine operating temperature. There is also a time-temperature recorder (TTRI) instrument produced by Howell Instruments, Inc. which may be utilized for recording the number of times an engine operating temperature (e.g. $T_{t7}$) rises above any of three arbitrarily selected temperature levels. There may be other prior proposals for obtaining some quantitative measure of the amount of useful life thus far consumed by a power plant or other apparatus or some portion of such apparatus such as a rotating bladed disk.

However, such available equipment has been criticized as being insufficiently accurate, especially with respect to cumulative low cycle fatigue damage for rotating bladed disk structures. For example, interoffice correspondence of Pratt and Whitney Aircraft, a division of United Aircraft Corporation, dated Sept. 16, 1971 from Mr. T. G. Meyer entitled "Adaptation of the Howell TTRI for J57-P-420 Cumulative LCF Damage Determination" investigates the possible use of the available Howell Instruments TTRI as a cumulative low cycle fatigue damage counter both in its original condition and after modification of the instrument. This mterial is hereby expressly incorporated by reference into this specification as a description of a prior art proposal having relevance to the subject matter of the present invention. (A copy of this material is physically of record in the file of this patent.

Briefly stated, the Meyer paper favors a proposal whereby the relevant disk speed or rpm is monitored rather than some other parameter such as temperature $T_{t7}$ which may be even more remotely related to the actual low cycle fatigue life for a given rotating bladed disk structure. The spectrum of possible parameter values is then divided into any desired plurality of regions defining different predetermined operating states for the bladed disk. For instance, the spectrum of possible rotor speeds between idle and takeoff rpm may be divided into four regions as proposed by Meyer with transition between the various regions being detected at three predetermined rpm values by an instrument similar to the Howell TTRI modified so as to detect three different predetermined levels of rpm rather than temperature. Once detected, Meyer proposes to record (how such data is to be recorded is not disclosed) each transition from one operating state to another such that, at the end of a complete operating mission, a complete sequential history of all such transitions between the various operating states is available in some recorded format. Meyer has also assigned a predetermined constant life ratio to each of the six possible operating state sequences between such four regions and proposes that the history of operating state sequences available at the completion of a particular mission be analyzed according to the following formula (based upon Miner's Rule) to obtain the true effective number of fatigue cycles actually consumed during the mission:

[Equation 1] $$\eta = \zeta N_\zeta + \delta N_\delta + \alpha N_\alpha + \epsilon N_\epsilon + \beta N_\beta + \gamma N_\gamma + 1\zeta$$

where $N_n$ = number of times a particular sequence n of operating regions has been traversed; and $\alpha, \beta, \gamma, 67, \epsilon, \zeta,$ = life ratio multiplicative constants for all six of the possible sequences between four operating regions (e.g., $\alpha \Rightarrow 1 \leftarrow 2$; $\beta \Rightarrow 2 \leftarrow 3$; $\gamma \Rightarrow 3 \leftarrow 4$; $\delta \Rightarrow 1 \leftarrow 2 \leftarrow 3$; $\epsilon \Rightarrow 2 \leftarrow 3 \leftarrow 4$; and $\gamma \Rightarrow 1 \leftarrow 2 \leftarrow 3 \leftarrow 4$)

Meyer also describes a specific example for a J57-P-420 turbine engine wherein the transition between regions 1, 2, 3 and 4 are respectively set at 93%, 82.5% and 70% of $N_2$ takeoff rpm. Under these assumptions the damage coefficient associated with each of the six possible operating state sequences are as follows:

$\alpha = 0.105$
$\beta = 0.021$
$\gamma = 0.003$
$\delta = 0.273$
$\epsilon = 0.027$
$\zeta = 0.330$ While the Meyer proposal thus indicates a generalized algorithm for improving the accuracy of low cycle fatigue damage masurement, the Meyer proposal is dependant upon some undefined mechanism for recording the sequence of operating state changes with some subsequent, presumably primarily manual, method being utilized for analyzing the recorded results so as to evaluate equation 1 at the conclusion of one or more complete missions.

Now, however, the present invention provides apparatus for automatically evaluating equation 1. Furthermore, in the presently preferred exemplary embodiment to be described in detail below, such calculation is carried out in substantially "real time" right after detecting the completion of each predetermined sequence of operating states. While such real time computation may not be necessary under certain conditions, it does, nonetheless, avoid the necessity of recording transitions between operating states for subsequent processing. Furthermore, the automatic processing means of this invention is more readily adaptable to a system wherein a greater number of operating regions are detected and classified as different operating states than would be possible in a manual or semimanual method.

The presently preferred exemplary embodiment employs a combination of analog and digital electronic circuitry. As will be apparent to those in the art from the following detailed description, portions of the digital circuitry could be implemented with analog circuitry and vice versa and/or portions of the digital circuitry could be implemented with a properly programmed general purpose digital computer if desired.

The exemplary embodiment to be described in more detail below provides an analog electrical signal having a magnitude representative of the rotating bladed disk rpm. This analog electrical signal is compared against various reference level signals in a plurality of comparators which provide output electrical signals indicative of the particular predetermined operating state then in occurrence for the rotating bladed disk. The outputs from these comparators is then processed in a sequence detection means which produces outputs corresponding to the detection of each of a plurality of predetermined operating state sequences at substantially the same time as each such sequence is actually completed by the rotating bladed disk. Such detection of a particular predetermined sequence is then correlated with a predetermined fixed damage coefficient and that particular damage coefficient is thereupon accumulated in a low cycle fatigue counter so as to provide an indication of cumulative low cycle fatigue damage done to the rotating bladed disk.

Since longer sequences of operating states may inherently include shorter sequences therewithin, special provisions are included in the exemplary embodiment for effectively ignoring shorter included sequences having the same terminal operating state as a longer detected sequence and/or for automatically compensating the input to the cumulative low cycle fatigue counter so as to compensate for inputs thereto caused by shorter included sequences within a detected longer sequence.

In the exemplary embodiment, a clock pulse generator is activated in response to the detection of any of the predetermined operating state sequences. The clock pulses thus produced are passed to a low cycle fatigue counter for accumulation therein and to a control counter which has theretofore been reset. The output of the control counter is decoded according to the predetermined damage coefficient constants with the output from such a decoder being utilized to cause deactivation of the clock pulse generator as soon as the correct predetermined number of clock pulses corresponding to the correct damage coefficient has been generated. In the exemplary embodiment, such clock pulse generator control is achieved by the ORed output of a plurality of flip-flops which are respectively set in response to the detection of corresponding operating state sequences and which are respectively reset by the decoder outputs from the control counter corresponding to the relevant damage coeffiicient.

These and other objects and advantages of this invention will be more completely understood from the following detailed description of an exemplary embodiment of this invention taken together with the accompanying drawings, of which:

FIG. 4 is a table showing voltage levels for various electrical signals in the embodiment of FIG. 3 when the operating state is located in the various possible operating regions as defined by FIG. 2.

Figure 1:
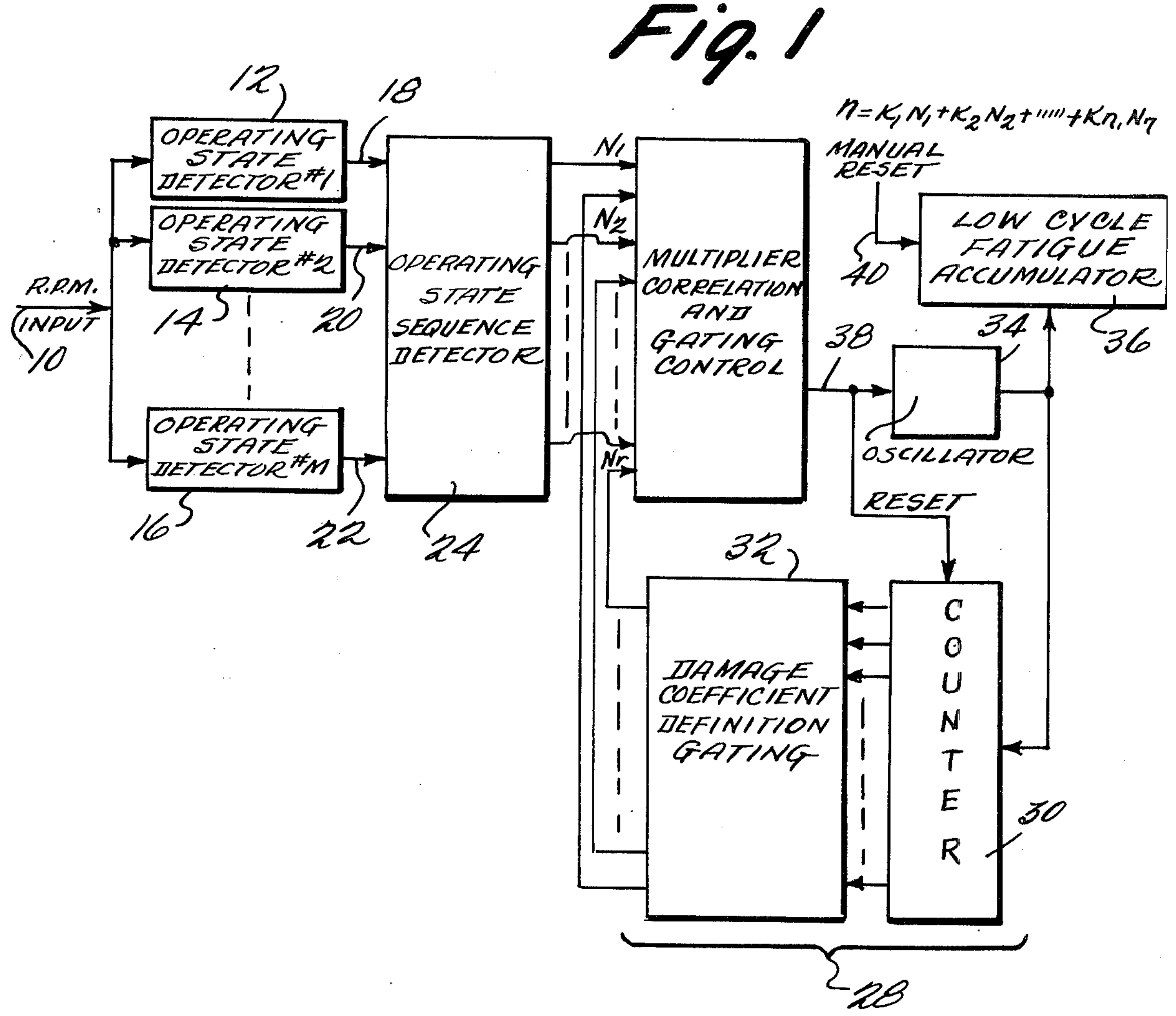
FIG. 1 is a schematic block diagram of an exemplary embodiment of this invention.

Referring to FIG. 1, an analog input signal is presented at 10. Preferably, this analog input is representative of rotating bladed disk rpm; however, it will also be understood that the analog input might represent other operating parameters (e.g. temperature $T_{t7}$) if desired. Furthermore, although the analog input at 10 is preferably a DC voltage proportional to the chosen operating parameter, other analog signal forms might also be used if the succeeding stages are designed or adapted to handle such other analog formats.

The analog input 10 is, in the exemplary embodiment of FIG. 1, simultaneously presented to a plurality of operating state detectors 1, 2, . . . M bearing reference numerals 12, 14, . . . 16 in FIG. 1. This battery of operating state detectors operates as a classification means for receiving the input signal 10 and detecting which of a plurality of predetermined operating states is then in occurrence and for producing a respectively corresponding output on one of lines 18, 20, . . . 22 in response to the detection of each different operating state. Thus, in the embodiment of FIG. 1, if the input signal 10 is classified as existing in operating state number 1, a corresponding output would be provided on line 18. On the other hand, if the input 10 is classified as within operating state number 2, then an output would be provided on line 20, etc.

The outputs 18, 20, . . . 22 from the classification means in FIG. 1 are presented to an operating state sequence detector 24. The function of th sequence detector is to determine when a predetermined sequence of operating states has occurred and for producing a corresponding output on one of its output lines $N_1$, $N_2$, . . . $N_n$. In the most general case, each possible sequence of operating states will be detected and a corresponding output will be provided corresponding thereto.

While the classification means and sequence detector means shown in FIG. 1 are depicted as having separate output lines for each of their separate output conditions, it should be appreciated that a single output line or group of output lines might be utilized instead provided that some means is provided for distinguishing between the various possible outputs of these means. For instance, the output of the classification means and/or sequence detector means might comprise a relatively small group of conductors with the various output states being distinguished according to a conventional binary coded decimal technique.

The outputs $N_1$, $N_2$, . . . $N_n$ are then presented to a sequence multiplier correlation and gating control means 26 which is also presented with corresponding damage coefficient inputs $K_1$, $K_2$, . . . $K_n$ from means 28 uniquely defining a respectively corresponding damage coefficient for each of the detected sequences $N_1$, $N_2$, . . . $N_n$. As shown in FIG. 1, the means 28 may take the form of a counter 30 whose output is appropriately decoded by logic gating circuitry 32. In the exemplary embodiment shown in FIG. 1, the counter 30 is driven by the output of oscillator 34 which also drives a low cycle fatigue accumulator 36. The oscillator 34 is activated and the counter 30 is reset by the output 38 from the correlation and gating control means 26. In this particular exemplary embodiment, an output will be provided on line 38 to activate the oscillator 34 any-time any of the sequences $N_1, N_2, \ldots N_n$ is detected. The clock pulses produced by the oscillator will then be accumulated in both counters 30 and 36 until the contents of counter 30 is detected by the logic gating circuitry of 32 to correspond to the particular coefficient $K_1, K_2, \ldots K_n$ respectively associated with a particular sequence that has just been detected, $N_1, N_2, \ldots N_n$. When such coincidence is detected, the signal on line 38 will change so as to deactivate the oscillator 34. The counter 30 is reset either before or after such an operation so as to be ready for the following cycle of operation.

Since the low cycle fatigue accumulator 36 is only manually reset at 40, it follows that the contents of the accumulator 36 will be a cumulative count of the effective number of fatigue cycles experienced by the rotating bladed disk under observation since the last manual reset at 40.

It should be appreciated that there are many possible schemes for activating or controlling the input to the accumulator 36 as a function of the output 38 from the sequence multiplier correlation and gating control means 26. For instance, the oscillator might be a free running oscillator with control gates inserted at its output for controlling the passage of pulses to counters 30, 36. Separate counters 30 might be provided for one or more of the sequences in $N_1, N_2, \ldots N_n$. Other variations and modifications of this purely exemplary embodiment will be apparent to those in the art.

It should now be appreciated that the FIG. 1 embodiment operates so as to accumulate in accumulator 36 the effective number of fatigue cycles through which the rotating bladed disk has passed since the last resetting of the accumulator 36. The number of such effective fatigue cycles is calculated according to the following polynomial equation:

$$\eta = \text{effective fatigue cycles} = K_1N_1 + K_2N_2 + \ldots K_nN_n$$

It will be observed that equation 2 is quite similar to equation 1 except for the unity term in equation 1.It will be recalled from the earlier discussion that such a unity term should be included for each mission. However, since each mission only involves one complete traversal of operating space from below idle rpm to takeoff rpm, it follows that such a unity term in the polynomial is but a special case that cnn be accounted for by detecting this unique sequence of operating states which will occur only once for each mission and associating a damage coefficient of unity with this unique sequence. In this manner, the low cycle fatigue accumulator 36 in the embodiment of FIG. 1 continues to cumulatively measure the effective number of fatigue cycle over a plurality of missions.

Figure 2:
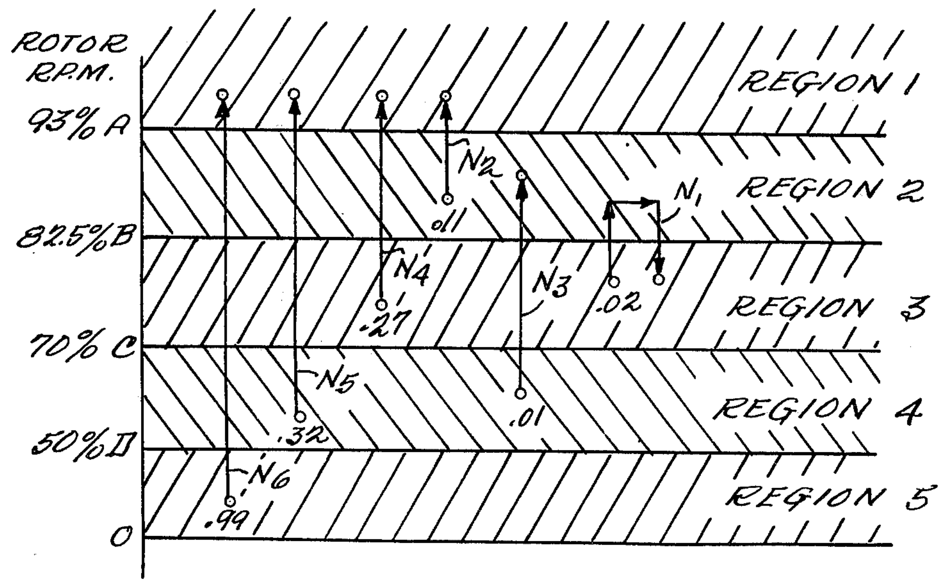
FIG. 2 is a graphical depiction of an explanatory assignment of different operating states, regions and sequences of operating states for a rotating bladed disk.
Figure 3:
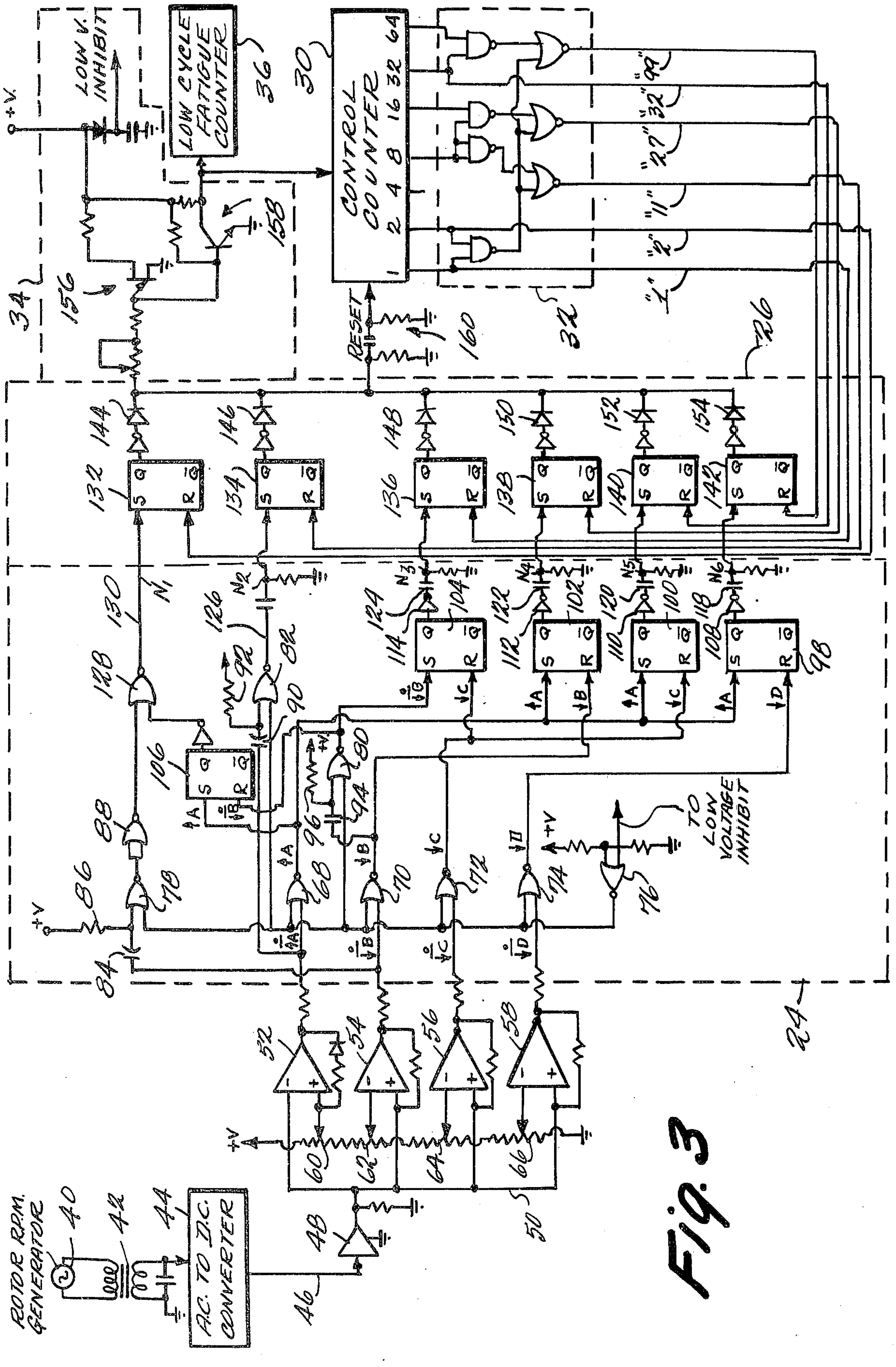
FIG. 3 is a detailed schematic circuit diagram showing one possible implementation of the FIG. 1 embodiment.

A specific exemplary circuit is shown in FIG. 3 as one possible realization of the FIG. 1 embodiment of this invention. FIGS. 2 and 4 are also related to this particular exemplary embodiment of FIG. 3 and are useful in helping one to understand its operation.

For purely exemplary and explanatory reasons, the specific exemplary embodiment of FIG. 3 herein will be described for the same assumed exemplary conditions as were used in the attached Meyer paper. Namely, it will be assumed that the J57-P-420 turbine engine is under consideration and that the transition between the various operating states will occur at 93%, 82.5% and 70% of $N_2$ takeoff rpm. In addition, to permit detection of the unique sequence of operating states which occurs only once per mission, a fourth transition between operating states will also be assumed to exist at 50% of $N_2$ takeoff rpm.

As will be seen in FIG. 2, such transitions have been labeled as A, B, C and D to effectively define five different regions of operating status for the rotating bladed disk under consideration. Also shown in FIG. 2 is a superimposed depiction of six possible sequences of operating states $N_1, N_2, \ldots N_6$. The beginning and terminal states of each sequence are represented by a large circular dot with the beginning and terminal states for a particular sequence being connected by a line having an arrow adjacent the terminal operating state.

By reference to the earlier stated equation 1 involving operating state sequences between regions 1–4, the following corresponding will be recognized between $N_{1-N6}$ and some of the terms of equation 1:

| Figure 2 | Corresponding Equation 1 term |
|---|---|
| $N_1$ | $N_\beta$ |
| $N_2$ | $N_\alpha$ |
| $N_3$ | $N_\epsilon$ |
| $N_4$ | $N_\delta$ |
| $N_5$ | $N_\gamma$ |
| $N_6$ | unity |

(Note: $N_\gamma$ has been disregarded throughout this exemplary embodiment since the incremental contribution to low cycle fatigue therefrom is about one order of magnitude less than any others).

It will be noted that sequence $N_3$ is smaller included sequence within sequences $N_6$ and $N_5$. Since the exemplary embodiment proceeds to increment the accumulator 36 as soon as a terminal state of a given sequence is reached and since the particular exemplary embodiment to be described herein does not distinguish between beginning sequence states that are reached from above and those that are reached from below, it follows that the accumulator 36 should be incremented for sequences $N_5$ and $N_6$ by an amount which takes into consideration the fact that it has already been incremented by the damage coefficient associated with sequence $N_3$. That is, in traversing sequences $N_5$and/or $N_6$, one will have inherently already traversed sequence $N_3$ and incremented accumulator 36 accordingly. Therefore, when one arrives at the terminal state of sequences $N_5$ and/or $N_6$, accumulator 36 should be incremented by a correspondingly reduced amount. As will be appreciated, the necessity for so compensating the damage coefficients associated with longer sequences for those of shorter included sequences could be eliminated if one were to distinguish between starting-/terminating states for a particular sequence that originated/terminated at a state therebove or one which originated/terminated from a state therebelow. Under this alternative embodiment, circuitry would be provided for disregarding sequence $N_3$ unless the beginning state (region 4) of that sequence was achieved from above by a transition from region 3 and unless the terminal state (region 2) of sequence $N_3$ is succeeded by a subsequent transition to region 3. Under such altered conditions, one would not have to compensate the input to accumulator 36 caused by a detection of longer sequence $N_5$ and/or $N_6$ since the lesser included sequence $N_3$ would have automatically been excluded because of either initial or terminal conditions from causing any input to the accumulator 36.

Similarly, sequence $N_2$ is a lesser included sequence within sequences $N_4$, $N_5$ and $N_6$. Likewise, sequence $N_4$ is included within sequence $N_5$ and $N_6$ and sequence $N_5$ included within sequence $N_6$. However, since all of these sequences $N_2$, $N_4$, $N_5$ and $N_6$ have monotonically increasing damage coefficients associated therewith, it is easiest to eliminate such possible ambiguity by simply effectively ignoring the lesser included damage coefficients which are simultaneously presented to the accumulator 36 so that the effective input to accumulator 36 is proper. For example, if sequence $N_5$ is detected, lesser included sequences $N_2$ and $N_4$ will also be detected at the same time when their terminal states in region 1 are detected.

Thereupon, the output from oscillator 34 will begin to accumulate in the low cycle fatigue accumulator 36. While the lesser damage coefficients associated with sequences $N_2$ and $N_4$ will cause corresponding inputs from the gating circuitry 32 through the gating control 36, they will not be effective to change the output on line 38. Rather, only when the largest damage coefficient associated with sequence $N_5$ is accumulated will the output from an OR gate controlling lines 38 be altered.

Finally, it should also be noted that the sequence $N_1$ is a lesser included sequence within sequence $N_3$. While sequence $N_1$ requires a transition from region 3 to region 2 and back again to region 3, it will be appreciated that such a transition is inherently included within sequence $N_3$ because any further transition from region 2 to region 1 would transform sequence $N_3$ into sequence $N_5$. In effect, $N_1$ is an exemplary showing of a sequence from region 3 to region 2 which has a terminal state further defined by a subsequent transition back to region 3 so as to distinguish $N_1$ from $N_4$. If desired, sequence $N_1$ could also be uniquely distinguished from sequence $N_3$ by defining a starting transition from region 2 to region 3 for $N_1$. However, for exemplary purposes, $N_1$ will be left as a lesser included sequence within $N_3$. Accordingly, the damage coefficient associated in this exemplary embodiment for sequence $N_3$ must be compensated to take into account the damage coefficient associated with lesser included sequence $N_1$ in the same manner that has previously been described with respect to sequences $N_5$ and $N_6$ vis a vis lesser included sequence $N_3$.

When all of the above factors are taken into account and the earlier damage coefficients associated with tble 1 are rounded to two decimal places, it will be appreciated that the following table correctly presents the appropriate damge coefficients $K_1$–$K_6$ for the particular exemplary embodiment to be herein described in detail:

$$K_1 = 0.02 \Rightarrow \beta = 0.02$$

$$K_2 = 0.11 \Rightarrow \alpha = 0.11$$

$$K_3 = 0.01 \Rightarrow \epsilon = 0.03 = K_3 + K_1$$

$$K_4 = 0.27 \Rightarrow \delta = 0.27$$

$$K_5 = 0.32 \Rightarrow \zeta = 0.33 = K_5 + K_3$$

$$K_6 = 0.99 \Rightarrow \text{unity} = 1.00 = K_6 + K_3$$

As should now be appreciated, if the exemplary embodiment is modified so as to uniquely distinguish each sequence (i.e., such as by distinguishing the approach direction to each beginning state and the departure direction from each terminal state of each sequence), then there would be no need to compensate damage coefficients $K_3$, $K_5$ and $K_6$ as shown in the above table 3.

As shown in FIG. 3, the preferred exemplary embodiment utilizes the output from a rotor rpm generator 40 which produces an analog electrical signal having a frequency or pulse repetition rate proportional to the rpm of the rotating bladed disk selected for observation purposes. This analog signal is coupled through a transformer 42 and converted to a dc analog signal by an ac to dc converter 44. The dc signal at 46 is then amplified as desired at 48 to drive the remaining circuitry to be described. It will be appreciated that the resulting analog input on buss 50 could be obtained in a number of such conventional fashions.

The analog input signal on buss 50 is then presented to one input of comparators 52, 54, 56 and 58 while the other input of such comparators is respectively connected to terminal 60, 62, 64 and 66 of a voltage divider which provides various levels of positive reference voltages to the comparators as will be appreciated from FIG. 3. The reference voltages input to comparators 52, 54, 56 and 58 are chosen so as to define the transitions A, B, C and D respectively between operating regions 1–5 as shown in FIG. 2. The polarity of the input terminal connections for the comparators 52, 54, 56 and 58 is chosen so as to provide low level output therefrom until the input on buss 50 rises above the respectively corresponding reference voltage except for comparator 52 which is reversly connected so as to provide a high output voltage level so long as the input on 50 is below the reference voltage level. The output from comparators 52, 54, 56 and 58 has been symbolically represented by $\uparrow\overline{A}$, $\downarrow\overline{B}$, $\downarrow\overline{C}$ and $\downarrow\overline{D}$ respectively and the corresponding voltage level of these signals is shown at the left side of FIG. 4 for analog inputs in the five different operating regions. In FIG. 4, it should be remembered that plus signs are utilized to denote high level voltages while the negative signs are utilized to denote low level voltages and not necessarily to denote a polarity change. Typically, the positive voltage level might be on the order of 10–12 volts or so while the lower voltage level might be on the order of zero or ground potential.

The voltage level outputs from comparators 52, 54, 56 and 58 are inverted by respectively corresponding NOR gates 68, 70, 72 and 74. The upper input to each of these just mentioned gates is normally enabled via a low voltage level input from NOR gate 76. However, if the voltage supply for the circuitry of FIG. 3 should ever go below the value necessary to sustain proper circuit operation, the normally low output of NOR gate 76 will change to a high output thereby disabling gates 68, 70, 72 and 74. Other NOR gtes 78, 80 and 82 also have one input connected to the low voltage inhibit line coming from the output of NOR gate 76. Accordingly, all such gates are effectively inhibited whenever a low voltage inhibit condition occurs thus effectively isolating the remainder of the circuitry from drawing significant current under such conditions.

The output of gates 68, 70, 72 and 74 therefore provide an inverted replica of the outputs of comparators 52, 54, 56 and 58. Accordingly, the output from gates 68, 70, 72, 74 are representative of conditions wherein the input signal of 50 is ↑A, ↓B, ↓C and ↓D and the voltage level corresponding to such outputs when the input signal at 50 is within the various five operating regions is depicted at the right hand portion of FIG. 4.

It will be noted that the output of NOR gate 78 goes high only for a brief period when the output from comparator 54 transitions from a high to low level due to the differentiating action of capacitor 84 and resistor 84 and resistor 86. Similarly, the output from inverting NOR gate 88 goes low from its normal high condition only during this same transition period as the output from comparator 54 transitions from high to low levels.

The output of NOR gate 82 is normally low but transitions to a temporary high level whenever the output of comparator 52 transitions from a high to low level output. The temporary nature of the output from gate 82 is caused by the differentiating action of capacitor 90 and resistor 92.

Similarly, the normally low output from NOR gate 80 transitions temporarily to a high level only when the output from gate 70 transitions from a high to low output level. The temporary nature of the output from gate 80 is caused by the differentiating action of capacitor 94 and resistor 96 as will be appreciated.

Flip-flops 98, 100, 102, 104 and 106 are RS flip-flops which are conventionally known in the art. Typically, such RS flip-flops are provided with an inverted output and, accordingly, inverters 108, 110, 112, 114 and 116 are shown as connected to the Q outputs of these RS flip-flops.

Looking at FIG. 3, it will be observed that RS flip-flop 98 is reset by the ↓D logic level signal and set by the ↑A logic level signal. Accordingly, the inverted Q output from flip-flop 98 on line 118 will be caused to transition to its high level only when flip-flop 98 has been reset and then set and such inputs to flip-flop 98 will occur only when the input signal on buss 50 has progressed from region 5 below level D to region 1 above level A. Accordingly, a positive going transition on line 118 represents the detection of sequence $N_6$ as previously defined. The differentiated positive going transition is thus available at terminal $N_6$ as shown in FIG. 3.

The inverted Q output on line 120 from flip-flop 100 may be similarly analyzed to see that a positive going transition thereat represents the detection of sequence $N_5$ as previously defined. Similarly, a positive going transition on line 122 from flip-flop 102 represents the detection of sequence $N_4$ as previously defined.

Flip-flop 104 is reset whenever operation is detected in region 4 below level C. It Is then set whenever a subsequent operation is detected within region 2 above level B. Such setting is obtained by differentiating (via capacitor 94 and resistor 96) and inverting (via NOR gte 80) the ↓B output of NOR gate 70. Accordingly, the inverted Q output flip-flop 104 on line 124 will experience a positive going transition whenever sequence $N_3$ is detected.

The sequence $N_2$ merely requires a transition into region 1 since there is only one way to approach region 1, namely from region 2. Accordingly, the ↑A output of comparator 52 is differentiated (via capacitor 90 and resistor 92) and inverted (via NOR gate 82) to provide a positive going transition on line 126 whenever sequence $N_2$ is detected. The upper input to NOR gate 128 in FIG. 3 is normally high. However, this upper input to gate 128 is temporarily lowered whenever a transition is made from region 2 to region 3 thereby causing the output of comparator 54 to transition from high to low, which negative going transition is differentiated (via capacitor 84 and resistor 86). Since cascaded NOR gates 78 and 88 doubly invert this negative going differentiated transition, the result is still a negative going transition at the upper input to gate 128. However, as will be appreciated, this negative going transition at the upper input to gate 128 will not provide any change in the output on line 130 unless the lower input to gate 128 is also at its lower level at the time of such transitioning.

A transition from region 3 to region 2 will provide a resetting input to flip-flop 106 by virtue of the negative going transition at the output of gate 70 which is differentiated (via capacitor 94 and resistor 96) and inverted (via gate 80). Thus the inverted Q output of flip-flop 106 is caused to go low and enable gate 128 to transition in a positive direction if there is a subsequent transition from region 2 to region 3 thus completing the definition of sequence $N_1$ as previously defined.

However, if subsequent to the resetting of fliplop 106 by transition from region 3 to region 2, a subsequent transition from region 2 to region 1 is detected by a positive going transition at the output of gate 68, this same positive going transition is also applied to set flip-flop 106 thus transitioning the inverted Q output thereof to its high level and disabling gate 128. Accordingly, the output of gate 128 will transition from low to high for a temporary period only in response to a transition from region 3 to region 2 and back again to region 3.

As should now be appreciated, there will be a temporary positive going transition at the output terminals $N_1$–$N_6$ of the operating state sequence detector 24 shown in FIG. 3 whenever the terminal state of one of the respectively corresponding previously defined sequences $N_1$–$N_6$ is attained.

As will be appreciated from FIG. 3, the RS flip-flops 132, 134, 136, 138, 140 and 142 are connected to be set by inputs $N_1$, $N_2$, $N_3$, $N_4N_5$ and $N_6$ respectively. Similarly, such RS flip-flops are connected to be respectively reset by corresponding inputs $K_1$, $K_2$, $K_3$, $K_4$, $K_5$ and $K_6$. Thus, whenever there is a positive going input on any of the input terminals $N_1$–$N_6$, the respectively associated flip-flop will be set thus causing its inverted Q output to transition from low to high. This high level output is logically combined in a NOR gate comprising diodes 144, 146, 148, 150, 152 and 154 respectively. Thus, if any of the RS flip-flops 132–142 are set, there will be a high voltage level condition on output line 38. This condition will persist until all of the set flip-flops 132–142 are reset by respectively corresponding inputs $K_1$–$K_6$.

A positive high level output signal on line 38 enables or activates oscillator 34 by providing an emitter bias input to unijunction transistor 156 connected in a conventional oscillator circuit. The output of the unijunction oscillator is amplified by transitor 158 and the output pulses are acumulated in a conventional low cycle counter 36. As will be appreciated, the low cycle fatigue counter 36 may comprise frequency dividers, if desired, pulse shaping, pulse gating and amplifying or driving circuitry as may be appropriate.

The clock pulses from oscillator 34 are also input to a control counter 30 which, in this exemplary embodiment is a conventional binary counter providing output terminals corresponding to a binary state. Thus, for a seven stage counter as shown in FIG. 3, there would be seven binary outputs corresponding to the states of the seven binary stages of the counter as should now be appreciated. These binary outputs are then decoded by conventional NAND and/or NOR gates as shown at 32 so as to provide appropriate positive going voltage level transitions when the contents of counter 30 has reached the desired contents. As shown in FIG. 3, outputs from decoder 32 are provided for a counter contents of 1, 2, 11, 27, 32, and 99. There will be appreciated by reference to table 3 above, that these counter contents (when divided by 100) correspond to the constants $K_1$–$K_6$ as defined above.

The positive going transition on output line 38 occuring at the start of an operation cycle or the negative going transition which will occur at the end of an operational cycle may be utilized via suitable pulse shaping circuitry such as the differentiator 160, to reset the control counter 30 just before or just after such an operational cycle as will be appreciated.

Although it is believed that the operation of this exemplary embodiment should now be apparent, some brief exemplary explanation will be given. Assume that one is starting from zero rpm and proceeds through sequence $N_6$ to takeoff rpm. In such a takeoff operation, the state of the rotating bladed roter would progress from region 5 successively through regions 4, 3, 2 and 1. Under such conditions, when operation in region 2 is achieved, a positive going output would be presented at output terminal $N_3$ thus setting flip-flop 136, providing a positive output on line 38 and activating clock pulse generator 34. As the first clock pulse is generated and acumulated in the low cycle fatigue counter 36, it is also utilized to increment control counter 30 thus providing a positive going trannsition on line $K_3$ at the output of decoder 32 to reset flip-flop 136 thus removing the activation input from oscillator 34 and ending this particular cycle of operation. Thus, as region 2 is reached, the low cycle fatigue counter is incremented by 0.01 (assuming an effective division by a factor of 100).

Continuing on in this same assumed sequence from region 5 to region 1, when region 1 is reached, positive going outputs will be presented at terminals $N_2$, $N_4$, $N_5$ and $N_6$. Thus, flip-flops 134, 138, 140 and 142 will all be set and, accordingly, output 38 will transition in a positive direction thus activating oscillator 34. Clock pulses produced by oscillator 34 will begin to be accumulated in counter 36 and will also cause counter 30 to increment from its reset status. When the contents of counter 30 reaches 11, an output $K_2$ will be provided to reset flip-flop 134. However, flip-flops 138, 140 and 142 are still set so as to continue the activation of oscillator 34. When the contents of counter 30 reaches 27, an output $K_4$ from decoder 32 will be produced so as to reset flip-flop 138. However, a positive level output is still present on line 38 from flip-flops 140 and 142 so that oscillator 34 continues to be activated and the cycle continues to go forward. Subsequently, the contents of counter 30 will reach the contents of 32 whereupon $K_5$ from decoder 32 will be presented to reset flip-flop 140. However, flip-flop 142 will still provide a positive activating for oscillator 34. Accordingly, the operation just described will continue unitl counter 30 reaches a contents of 99 whereupon an output case of 6 from decoder 32 will be presented to reset flip-flop 142. At this time all of the flip-flops 132–142 will have been reset thus removing the positive output from line 38 and deactivating the oscillator 34.

The net result of the just described action was to effectively ignore the lesser included sequences $N_2$, $N_4$ and $N_5$ since all such lesser included sequences have the same terminal state as the overall sequence $N_6$. As should be appreciated, if the sequence was to start from rgion 4 rather than region 5, lesser included sequences $N_2$ and $N_4$ would be similarly effectively ignored when sequence $N_5$ was detected by arrival at the teminal state in region 1.

It should also be appreicated that by traversing from region 5 to region 1, the low cycle fatigue counter 36 was actually incremented by 100 clock pulses corresponding to the unity factor represented by the sum of damage coefficient $K_6$ and $K_3$ as set forth in table number 3 above.

Although only one detailed embodiment of this invention has been described with respect to specific electrical circuitry, those skilled in the art will recognize that there are many possible variations and modifications in this particular exemplary embodiment which may be made without materially departing from the novel features and advantages of this invention. Some of such variations and modifications have been specifically alluded to heretofore and others will be apparent to those in the art. For example, as will appreciated by those in the art, the invention will also apply to other rotating members in a turbine or compressor such as shafts or the like. All such variations and modifications are intended to be included within the scope of this invention as defined in the appended claims.

What is claimed is:

1. Apparatus for detecting and indicating cumulative low cycle fatigue damage done to a rotating member due to the sequential passage of said member through different operating states, said apparatus comprising:

input means for providing an electrical input signal representative of the existing operating state of said rotating member.

classification means connected to receive said input signal for detecting which of a plurality of predetermined operating states is then in occurrence and for producing a respectively corresponding output in response to detection of each different operating state, sequence detection means for receiving the output from said classification means and for detecting which of a plurality of predetermined sequences of operating states have occurred and for producing a respectively corresponding output in response to detection of each different predetermined sequence of operating states, damage coefficient determining and correlation means operatively connected to receive the output from said sequence detection means for defining a predetermined constant number of each said predetermined plurality of sequences and for respectively associating each of said constant numbers and said sequences, and acccumulator means connected to the output of the damage coefficient determining and correlation means for receiving therefrom electrical signals representing the constant number corresponding to the detected predetermined sequence of operating states and to cumulatively add and totalize such constant numbers thereby providing an indication of cumulative low cycle fatigue damage done to the rotating member.

2. Apparatus as in claim 1 wherein said input means includes means for producing a voltage representative of the rotational speed of said rotating member.

3. Apparatus as in claim 2 wherein said classification means comprises:

a plurality of comparators, each comparator having two inputs and being adapted to compare electrical signals presented thereto and to provide one of two electrical outputs depending upon the relative values of the electrical signals applied to its inputs, one input of each comparator being connected to receive said electrical input signal, reference signal generation means for providing a plurality of electrical reference signals, and the other remaining input of each comparator being connected to receive a respectively corresponding one of said elecrtrical reference signals.

4. Apparatus as in claim 3 wherein said sequence detection means comprises:

a plurality of logic control means, each logic control means having at least one input connected to receive at least one of the outputs of said classification means corresponding to the beginning and to the ending operating state of a particular predetermined sequence of operating states, each logic control means providing an electrical output and being adapted to provide a change in its output in response to changes at its input indicating the passage of said rotating member from its respectively associated beginning operating state through its respectively associated ending operating state.

5. Apparatus as in claim 4 wherein said logic control means comprise flip-flop circuits having two stable states that are changed from one stable state to the other in response to detected passages of said rotating member through the respectively associated beginning and ending operating states of the respectively associated predetermined sequence of operating states.

6. Apparatus as in claim 4 wherein said damage coefficient determining and correlation means comprises:

clock pulse generation means for providing a train of recurrent clock pulses, control counter means connected to count said clock pulses and to provide counter outputs representative of the number of such pulses counted, and a plurality of logic gate means connected to receive said counter outputs and to provide a plurality of damage coefficient outputs, each such output being representative of a predetermined constant number of clock pulses, correlation logic control means having a plurality of pairs of inputs and at least one output, each pair of inputs being connected to receive a respectively corresponding one of said outputs from the sequence detection means and respectively corresponding one of said counter outputs, said correlation logic control means providing a control signal at its output representing the occurrence of the particular predetermined constant number of counted clock pulses corresponding to the detected particular predetermined sequence of operating states that has occurred.

7. Apparatus as in claim 6 wherein said accumulator means is connected to receive and to cumulatively count said clock pulses, and further comprising:

control means connected for controlling the flow of said clock pulses to said accumulator means in response to said control signal from said correlation logic control means.

8. Apparatus as in claim 7 further comprising:

means for resetting said control counter means in response to said control signal from said correlation logic means.

9. Apparatus as in claim 8 wherein said accumulator means is connected to receive and to cumulatively count said clock pulses and further comprising control means connected to control the operation of said clock pulse generation means in response to the control signal from said correlation logic control means.

10. Apparatus as in claim 1 wherein said classification means comprises;

a plurality of comparators, each comparator having two inputs and being adapted to compare electrical signals presented thereto and to provide one of two electrical outputs depending upon the relative values of the electrical signals applied to its inputs, one input of each comparator being connected to receive said electrical input signal, reference signal generator means for providing a plurality of electrical reference signals, and the other remaining input of each comparator being connected to receive a respectively corresponding one of said electrical reference signals.

11. Apparatus as in claim 1 wherein said sequence detection means comprises:

a plurality of logic control means, each logic control means having at least one input connected to receive at least one of the outputs of said classification means corresponding to the beginning and to the ending operating state of a particular predetermined sequence of operating states, each logic control means providing an electrical output and being adapted to provide a change in its output in response to changes at its input indicating the passage of said disk from its respectively associated beginning operating state through its respectively associated ending operating state.

12. Apparatus as in claim 11 wherein at least some of said logic control means comprise flip-flop circuits having two stable states that are changed from one state to the other in response to detected passages of said rotating member through the respectively associated beginning and ending operating states of the respectively associated predetermined sequence of operating states.

13. Apparatus as in claim 1 wherein said damage coefficient determining and correlation means comprises:

clock pulse generation means for providing a train of recurrent clock pulses, control counter means connected to count said clock pulses and to provide counter outputs representative of the number of such pulses counted, and a plurality of logic gate means connected to receive said counter outputs and to provide a plurality of damage coefficient outputs, each such output being representative of a predetermined constant number of counted clock pulses, correlation logic control means having a plurality of pairs of inputs and at least one output, each pair of inputs being connected to receive a respectively corresponding one of said outputs from the sequence detection means and respectively corresponding one of said counter outputs, said correlation logic control means providing a control signal at its output representing the occurrence of the particular predetermined constant number of counted clock pulses corresponding to the detected particular predetermined sequence of operating states that has occurred.

14. Apparatus as in claim 13 wherein said accumulator means is connected to receive and to cumulatively count said clock pulses, and further comprising control means connected for controlling the flow of said clock pulses to said accumulator means in response to said control signal from said correlation logic control means.

15. Apparatus as in claim 13 further comprising means for resetting said control counter means in response to said control signal from said correlation logic control means.

16. Apparatus as in claim 15 wherein said accumulator means is connected to receive and to cumulatively count said clock pulses and further comprising contol means connected to control the operation of said clock pulse generation means in response to the control signal from said correlation logic control means.

* * * * *